United States Patent
DeForest et al.

(10) Patent No.: US 8,380,922 B1
(45) Date of Patent: Feb. 19, 2013

(54) DATA STORAGE DEVICE COMPRISING HOST INTERFACE STATE MACHINE BLOCKING ON TARGET LOGICAL BLOCK ADDRESS

(75) Inventors: Marvin R. DeForest, Niwot, CO (US); Christopher J. Reed, Boulder, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 285 days.

(21) Appl. No.: 12/823,437

(22) Filed: Jun. 25, 2010

(51) Int. Cl.
*G06F 12/00* (2006.01)
*G06F 13/00* (2006.01)
*G06F 13/28* (2006.01)

(52) U.S. Cl. .......................... 711/112; 711/154; 711/167

(58) Field of Classification Search ................... 711/112, 711/154, 167
See application file for complete search history.

(56) References Cited

U.S. PATENT DOCUMENTS

| | | | |
|---|---|---|---|
| 5,016,160 A | 5/1991 | Lambeth et al. | |
| 5,890,014 A | 3/1999 | Long | |
| 5,944,802 A | 8/1999 | Bello et al. | |
| 5,946,708 A | 8/1999 | Fang et al. | |
| 6,108,723 A | 8/2000 | Simms et al. | |
| 7,434,023 B2 * | 10/2008 | Nodomi et al. | 711/202 |
| 2008/0270643 A1 | 10/2008 | Tashiro | |
| 2010/0023655 A1 | 1/2010 | Hirayama | |
| 2011/0161552 A1 * | 6/2011 | Lund et al. | 711/103 |

* cited by examiner

*Primary Examiner* — Christian P Chace
*Assistant Examiner* — Ryan Bertram

(57) ABSTRACT

A data storage device is disclosed wherein a host interface state machine receives an access command from a host, the access command identifying a plurality of logical block addresses (LBAs). A host interface processor generates at least one control structure executed by the host interface state machine in connection with servicing the access command. The host interface processor directs a master processor to execute the access command, and the master processor updates a LBA register in connection with executing the access command. The host interface state machine executes the control structure to compare a target LBA to the LBA register and communicates with the host in response to the comparison.

18 Claims, 5 Drawing Sheets

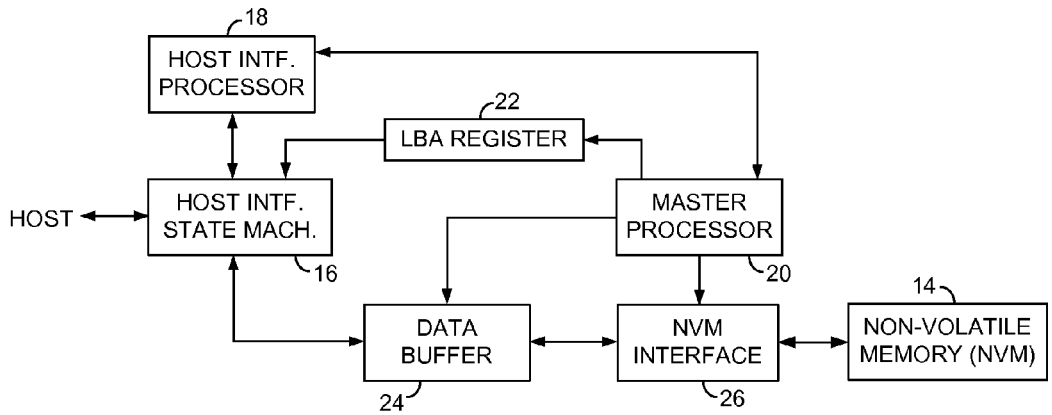
FIG. 2A
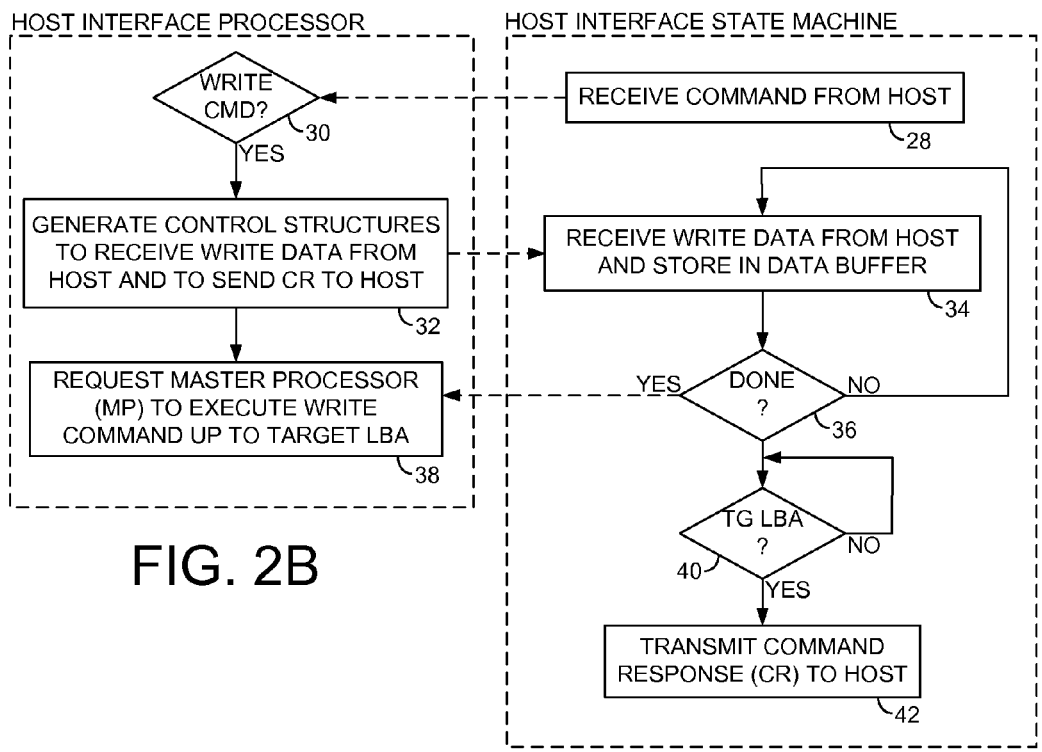
FIG. 2B
FIG. 2C

DATA STORAGE DEVICE COMPRISING HOST INTERFACE STATE MACHINE BLOCKING ON TARGET LOGICAL BLOCK ADDRESS

BACKGROUND

Data storage devices (DSDs), such as disk drives and solid state drives, are employed in numerous applications such as computer systems (e.g., desktops, laptops, portables, servers, etc.) and consumer devices (e.g., music players, cell phones, cameras, etc.). Business solutions (enterprise computing) typically employ higher end DSDs, such as Serial Attached SCSI (SAS), that support features such as fiber channel for implementing multiple initiators and full duplex communication. In order to achieve the higher throughput demanded by enterprise computing, high end DSDs typically employ multiple processors performing tasks in parallel. FIG. 1 shows an example high end prior art DSD comprising a host interface state machine 2 and a host interface processor 4 for implementing host interface functions, and a master processor 6 for executing access commands (read/write) using dedicated interface circuitry 8 that interfaces with a non-volatile memory 10 (e.g., a disk or semiconductor memory). A data buffer 12 buffers write data during write operations and read data during read operations.

The host interface state machine 2 implements a suitable protocol to communicate with the host and receive access commands (read/write). When an access command is received, the host interface processor 4 is notified so that it may generate control structures for the host interface state machine 2 needed to process the access command. The host interface processor 4 also transmits command information to the master processor 6 which executes the access command by accessing the NVM 10 through the NVM interface 8. Conventionally, the master processor 6 signals the host interface processor 4 that a write command has completed when the write data has been written to the NVM 10, and that a read command has completed (or partially completed) when read data is in the data buffer 12 and ready for transmission to the host. The delay that results from this inter-processor communication decreases throughput of the DSD since it delays the host interface state machine 2 executing the control structures needed to communicate with the host.

BRIEF DESCRIPTION OF THE DRAWINGS

FIG. 2A shows a DSD according to an embodiment of the present invention wherein when executing a host access command the master processor updates a logical block address (LBA) register which is monitored by a host interface state machine to determine when to communicate with the host.

FIG. 2B is a flow diagram executed by a host interface processor to service a host write command according to an embodiment of the present invention FIG. 2C is a flow diagram executed by the host interface state machine to service the host write command according to an embodiment of the present invention.

DETAILED DESCRIPTION OF EMBODIMENTS OF THE INVENTION

Figure 1:
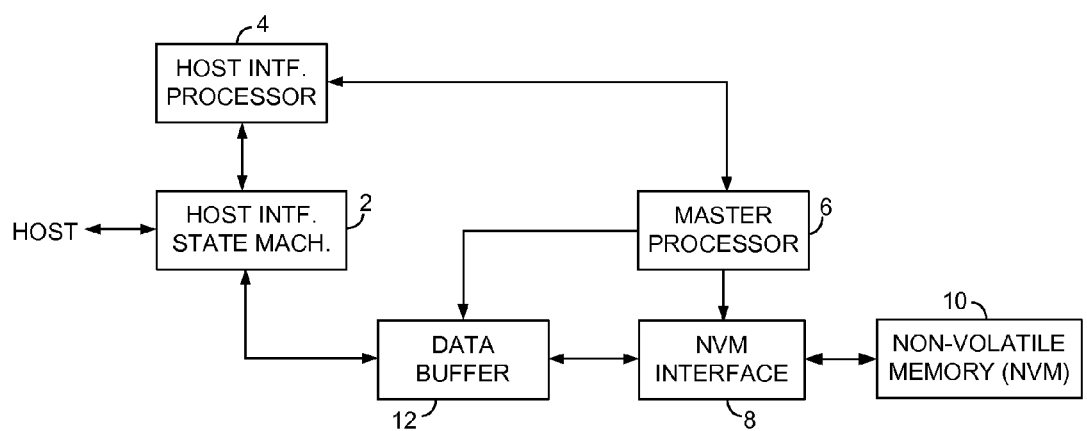
FIG. 1 shows a prior art data storage device (DSD) comprising a master processor that signals a host interface processor after executing a host access command.

FIG. 2A shows a data storage device (DSD) according to an embodiment of the present invention comprising a non-volatile memory (NVM) 14, and a host interface state machine 16 interfacing with a host by executing control structures, wherein a host interface processor 18 executes code segments for generating the control structures for the host interface state machine 16. A master processor 20 executes code segments for executing access commands to the non-volatile memory 14. The host interface state machine 16 receives an access command from the host, wherein the access command identifies a plurality of logical block addresses (LBAs). The host interface processor 18 generates at least one control structure executed by the host interface state machine 16 in connection with servicing the access command. The host interface processor 18 directs the master processor 20 to execute the access command, and the master processor 18 updates an LBA register 22 in connection with executing the access command. The host interface state machine 16 executes the control structure to compare a target LBA to the LBA register 22 and communicates with the host in response to the comparison.

The DSD of FIG. 2A further comprises a data buffer 24 for buffering write data received from the host during write commands, and for buffering read data transmitted to the host during read commands. In one embodiment, the host interface state machine 16 executes control structures configured by the host interface processor 18 for accessing the data buffer 24. During write operations, the master processor 18 also accesses the data buffer in order to write data to the NVM 14 through an NVM interface 26, as well as to store data read from the NVM 14 in the data buffer 24 through the NVM interface 26.

The DSD may implement any suitable communication protocol, such as Serial Attached SCSI (SAS) or Serial Attached Technology Attachment (SATA). In one embodiment, the host interface processor 18 generates the control structures for implementing the communication protocol, and the host interface state machine 16 executes the control structures to perform the low level transactions to communicate with the host. In one embodiment, access commands are executed in blocks of data (e.g., frames), wherein a command response is transmitted to the host after transmitting all of the data blocks. For example, a command response may indicate whether a write command completed successfully by writing all of the write blocks to the NVM 14, or the command response may indicate whether a read command completed successfully with an error-free transmission of all read blocks to the host.

FIGS. 2B and 2C show flow diagrams executed by the host interface processor 18 and the host interface state machine 16 when executing a host write command. When the host interface state machine receives an access command from the host (step 28), the command is evaluated by the host interface processor (step 30). When the host interface processor identifies the access command as a write command, it generates a first control structure for the host interface state machine to receive the write data from the host, a second control structure to compare a target LBA corresponding to the write command to the LBA register, and a third control structure to transmit a command response to the host (step 32). The host interface state machine then executes the first control structure to receive the write data from the host (step 34) which is stored in the data buffer 24. After the host interface state machine has received all of the write data (step 36), the host interface processor directs the master processor to store the received write data to the non-volatile memory up to the target LBA (step 38). As the master processor executes the write command, it updates the LBA register as each LBA is written. The host interface state machine executes the second control structure to compare the target LBA to the LBA register (step 40), and when the target LBA is less than or equal to the LBA register (indicating the master processor has completed the write command), the host interface state machine executes the third control structure to send a command response (CR) to the host (step 42).

In one embodiment, the host interface state machine 16 executes at least the second and third control structures described above with reference to FIG. 2C independent of the host interface processor 18. That is, once the master processor 20 begins executing the write command, the host interface state machine 16 monitors the LBA register 22 to detect when the write command has completed, and then sends a command response to the host independent of the host interface processor 18. This enables the host interface processor to generate the control structures for processing the write command, and configure the host interface state machine to execute the control structures without needing to determine when the master processor has completed a write command. In addition, blocking execution within a control structure of the host interface state machine reduces the latency in servicing access commands. Rather than wait for the host interface processor to enable the host interface state machine to send a response to the host, the host interface state machine is able to send a command response immediately after the master processor completes the write command (immediately after the master processor updates the LBA register with the target LBA).

Figure 3:
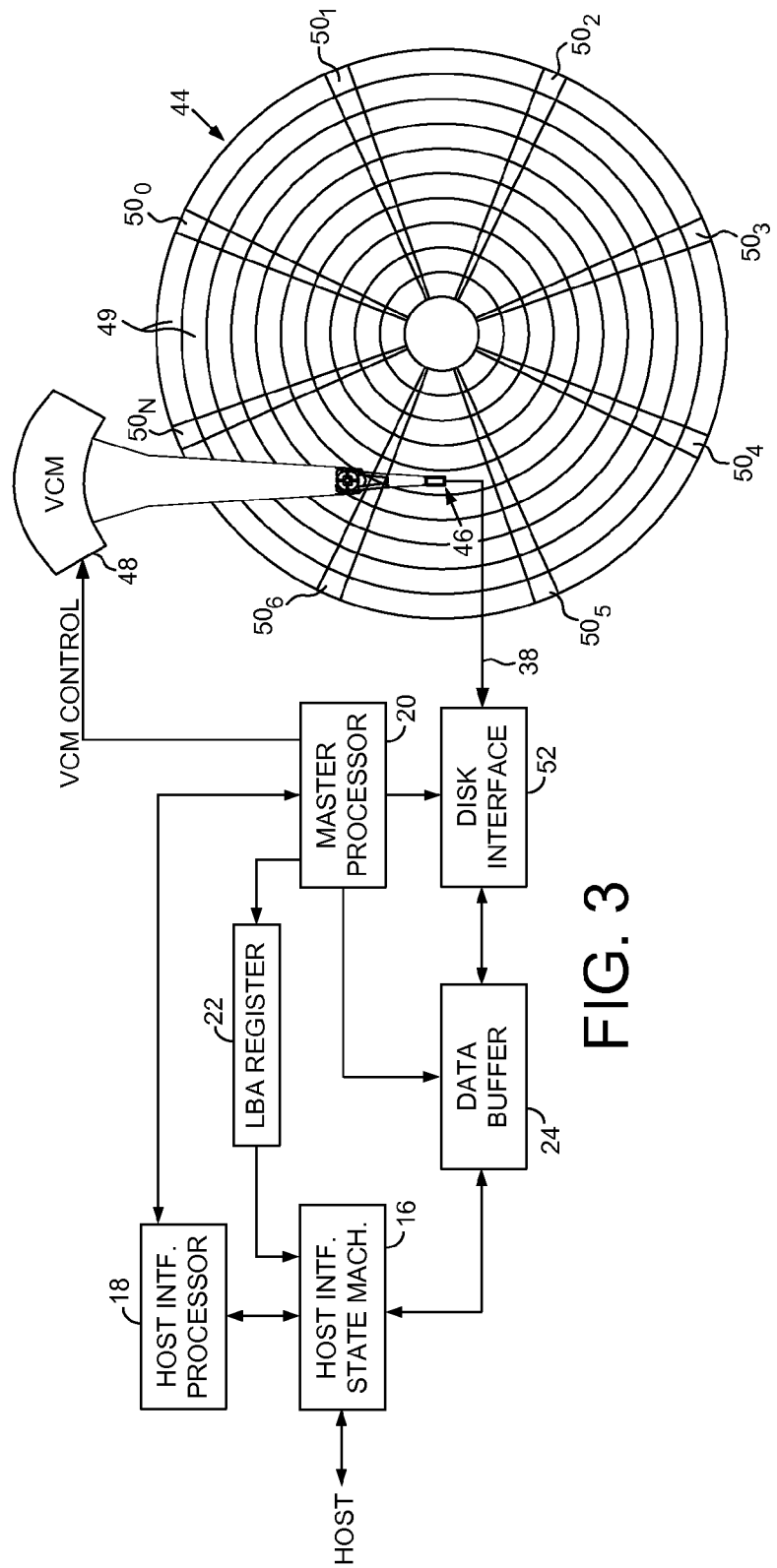
FIG. 3 shows an embodiment of the present invention wherein the non-volatile memory of the DSD comprises a disk.

The DSD of FIG. 2A may comprise any suitable NVM 14, such as a disk 44 of a disk drive as shown in the embodiment of FIG. 3. In this embodiment, a head 46 is actuated over the disk 44 by a voice coil motor (VCM) 48. The disk 44 comprises a number of data tracks 49 defined by a number of embedded servo sectors $50_0$-$50_N$ recorded around the circumference of the disk 44. Each data track comprises a plurality of data sectors for storing data received from the host, wherein each data sector is accessed indirectly through an LBA. During a write operation, the master processor 20 positions the head 46 over a target data track and writes the host data to the data sectors identified by the LBAs in the write command. As each data sector is written to the disk 44, the master processor 20 updates the LBA register 22 with the LBA written. In the embodiment of FIG. 3, the NVM interface comprises a disk interface 52 including suitable control circuitry such as a read/write channel and a preamp.

Figure 4:
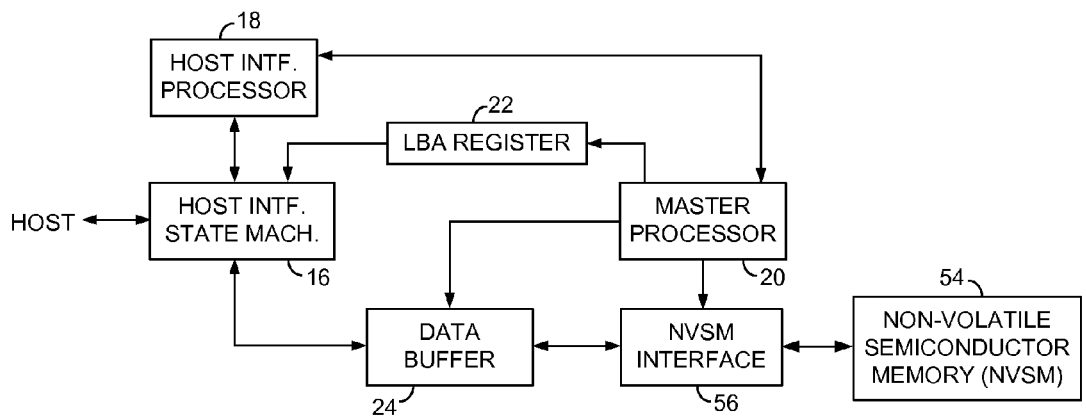
FIG. 4 shows an embodiment of the present invention wherein the non-volatile memory of the DSD comprises a non-volatile semiconductor memory.

FIG. 4 shows an embodiment of the present invention wherein the NVM 14 in the DSD comprises a non-volatile semiconductor memory 54 (e.g., a flash memory) which may be employed in a solid state drive or a hybrid drive (a disk drive comprising a flash memory). In one embodiment, the NVSM 54 comprises a memory array including a plurality of memory blocks, wherein each memory block is accessed in memory segments referred to as pages. Each page may store one or more data sectors, wherein each data sector is accessed indirectly through an LBA. In the embodiment of FIG. 4, the NVM interface comprises a suitable NVSM interface 56 including suitable control circuitry such as a flash controller.

Figure 5:
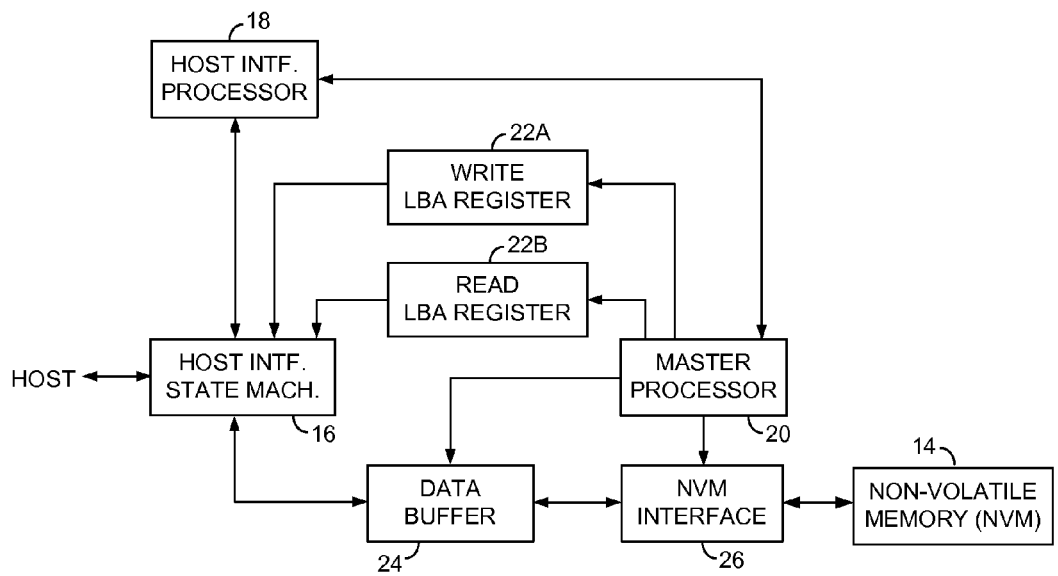
FIG. 5 shows a DSD according to an embodiment of the present invention comprising a write LBA register and a read LBA register updated by the master processor during write/read operations.

FIG. 5 shows a DSD according to an embodiment of the present invention wherein the LBA register 22 of FIG. 2A comprises a write LBA register 22A and a read LBA register 22B. The master processor updates each LBA register corresponding to when it is executing write or read commands. This embodiment may enable multiple host initiators to issue separate write/read commands to the DSD which may be processed in parallel. In other embodiments, the LBA register 22 may comprise multiple read and multiple write LBA registers for concurrently servicing write/read access commands from multiple host initiators. The LBA register 22 may comprise any suitable circuitry, such as a memory segment in a separate memory IC accessible by both the host interface state machine 16 and the master processor 20. In another embodiment, the LBA register may comprise a memory segment integrated with the host interface state machine 16, or integrated with the master processor 20, or all three components may be integrated in a single IC or system on a chip (SOC).

Figures 6A, 6B:
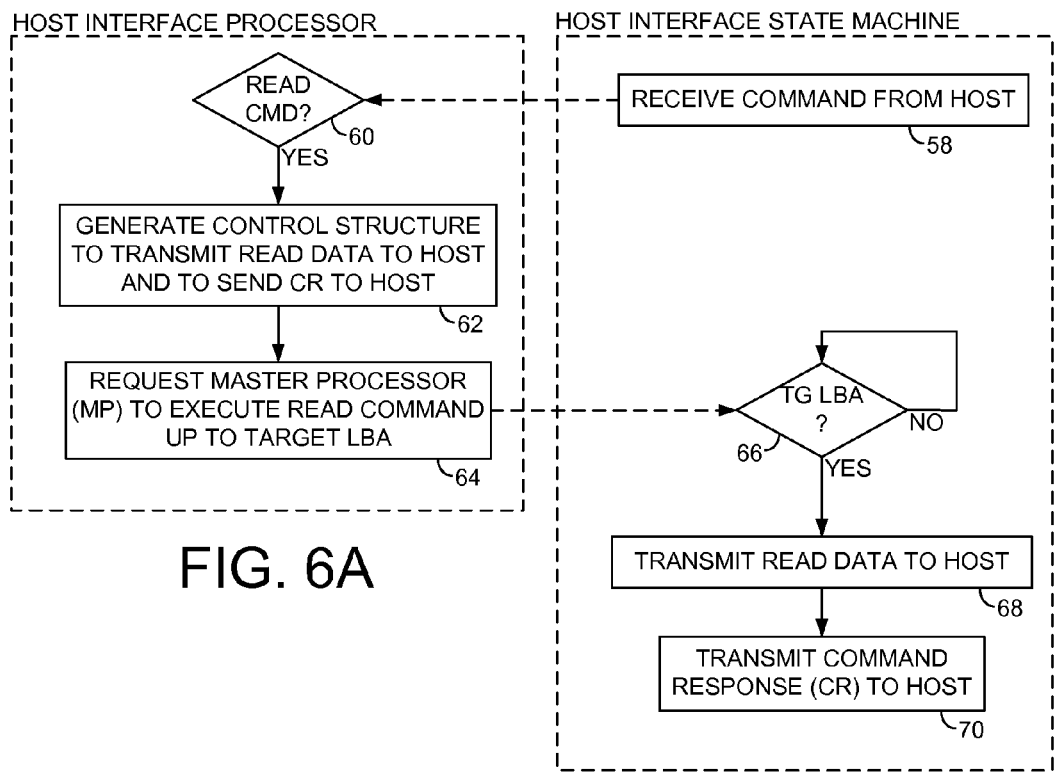
FIG. 6A is a flow diagram executed by the host interface processor to service a host read command according to an embodiment of the present invention
FIG. 6B is a flow diagram executed by the host interface state machine to service the host read command according to an embodiment of the present invention.

FIGS. 6A and 6B show flow diagrams executed by the host interface processor 18 and the host interface state machine 16 when executing a host read command. When the host interface state machine receives an access command from the host (step 58), the command is evaluated by the host interface processor (step 60). When the host interface processor identifies the access command as a read command, it generates a first control structure for the host interface state machine to compare the target LBA to the LBA register, a second control structure to transmit read data to the host, and a third control structure to transmit a command response to the host (step 62). The host interface processor then directs the master processor to read the LBAs identified in the read command from the non-volatile memory, up to the target LBA representing the last LBA of the read command (step 64). As the master processor executes the read command and stores the data from the LBAs in the data buffer, it updates the LBA register as each LBA is read. The host interface state machine executes the first control structure to compare the target LBA to the LBA register (step 66), and when the target LBA is less than or equal to the LBA register (indicating the master processor has completed the read command), the host interface state machine executes the second control structure to transmit the read data stored in the data buffer to the host (step 68), and then executes the third control structure to send a command response (CR) to the host (step 70).

The host interface processor 18 may generate the control structures for the host interface state machine 16 in any suitable manner. In one embodiment, the control structures may be implemented as a linked list or an array of control structures, wherein the host interface state machine executes each control structure until it reaches the end of the linked list or array. When servicing an access command, the host interface processor 18 generates the linked list or array of control structures which are then "handed" to the host interface state machine 16 to execute independent (or at least substantially independent) from the host interface processor, thereby distributing the processing and reducing access latency that may otherwise occur.

In one embodiment, the access commands received from the host may be executed by the DSD in blocks of data. For example, a large write or read command may be executed in a number of blocks, wherein the host interface processor generates the control structures for the host interface state machine to autonomously process each block as described above. After processing the last block (write or read), the host interface state machine executes a final control structure to send the command response to the host.

What is claimed is:

1. A data storage device comprising:
   a non-volatile memory;
   a host interface state machine operable to interface with a host by executing control structures;
   a host interface processor operable to execute code segments for generating the control structures for the host interface state machine;
   a master processor operable to execute code segments for executing access commands to the non-volatile memory; and
   a logical block address (LBA) register;
   wherein:
      the host interface state machine is operable to receive an access command from the host, the access command identifying a plurality of LBAs including an end LBA;
      the host interface processor is operable to generate at least one control structure executed by the host interface state machine in connection with servicing the access command;
      the host interface processor is operable to direct the master processor to execute the access command;
      the master processor is operable to update the LBA register in connection with executing the access command; and
      the host interface state machine is operable to execute the control structure to compare the end LBA to the LBA register and communicate with the host in response to the comparison.

2. The data storage device as recited in claim 1, wherein when the access command received from the host comprises a write command:
   the host interface processor generates a first control structure for the host interface state machine to receive write data from the host, a second control structure to compare the end LBA to the LBA register, and a third control structure to transmit a command response to the host;
   the host interface state machine executes the first control structure to receive the write data from the host;
   the host interface processor directs the master processor to write the received write data to the non-volatile memory; and
   the host interface state machine executes the second control structure to compare the end LBA to the LBA register, and executes the third control structure to transmit the command response to the host in response to the comparison.

3. The data storage device as recited in claim 2, wherein the host interface state machine executes at least the second and third control structures independent of the host interface processor.

4. The data storage device as recited in claim 1, wherein when the access command received from the host comprises a read command:
   the host interface processor generates a first control structure for the host interface state machine to compare the end LBA to the LBA register, a second control structure to transmit read data to the host, and a third control structure to transmit a command response to the host;
   the host interface processor directs the master processor to read the read data from the non-volatile memory; and
   the host interface state machine executes the first control structure to compare the end LBA to the LBA register, executes the second control structure to transmit the read data to the host in response to the comparison, and executes the third control structure to transmit the command response to the host.

5. The data storage device as recited in claim 4, wherein the host interface state machine executes the first, second, and third control structures independent of the host interface processor.

6. The data storage device as recited in claim 1, wherein the host interface state machine communicates with the host when the end LBA is less than or equal to the LBA register.

7. The data storage device as recited in claim 1, wherein the host interface processor is operable to generate a linked list of control structures executed by the host interface state machine in connection with servicing the access command.

8. The data storage device as recited in claim 1, wherein the non-volatile memory comprises a disk.

9. The data storage device as recited in claim 1, wherein the non-volatile memory comprises a non-volatile semiconductor memory.

10. A method of operating a data storage device, the data storage device comprising a non-volatile memory, a host interface state machine operable to interface with a host by executing control structures, a host interface processor operable to execute code segments for generating the control structures for the host interface state machine, a master processor operable to execute code segments for executing access commands to the non-volatile memory, and a logical block address (LBA) register, the method comprising:
   the host interface state machine receiving an access command from the host, the access command identifying a plurality of LBAs including an end LBA;
   the host interface processor generating at least one control structure executed by the host interface state machine in connection with servicing the access command;
   the host interface processor directing the master processor to execute the access command;
   the master processor updating the LBA register in connection with executing the access command; and
   the host interface state machine executing the control structure to compare a the end LBA to the LBA register and communicate with the host in response to the comparison.

11. The method as recited in claim 10, wherein when the access command received from the host comprises a write command, the method further comprising:
   the host interface processor generating a first control structure for the host interface state machine to receive write data from the host, a second control structure to compare the end LBA to the LBA register, and a third control structure to transmit a command response to the host;
   the host interface state machine executing the first control structure to receive the write data from the host;
   the host interface processor directing the master processor to write the received write data to the non-volatile memory; and
   the host interface state machine executing the second control structure to compare the end LBA to the LBA register, and executes the third control structure to transmit the command response to the host in response to the comparison.

12. The method as recited in claim 11, further comprising the host interface state machine executing at least the second and third control structures independent of the host interface processor.

13. The method as recited in claim 10, wherein when the access command received from the host comprises a read command, the method further comprising:

the host interface processor generating a first control structure for the host interface state machine to compare the end LBA to the LBA register, a second control structure to transmit read data to the host, and a third control structure to transmit a command response to the host;

the host interface processor directing the master processor to read the read data from the non-volatile memory; and the host interface state machine executing the first control structure to compare the end LBA to the LBA register, executes the second control structure to transmit the read data to the host in response to the comparison, and executes the third control structure to transmit the command response to the host.

14. The method as recited in claim 13, further comprising the host interface state machine executing the first, second, and third control structures independent of the host interface processor.

15. The method as recited in claim 10, further comprising the host interface state machine communicating with the host when the end LBA is less than or equal to the LBA register.

16. The method as recited in claim 10, further comprising the host interface processor generating a linked list of control structures executed by the host interface state machine in connection with servicing the access command.

17. The method as recited in claim 10, wherein the non-volatile memory comprises a disk.

18. The method as recited in claim 10, wherein the non-volatile memory comprises a non-volatile semiconductor memory.

* * * * *